(12) United States Patent
Berman

(10) Patent No.: US 9,797,692 B2
(45) Date of Patent: *Oct. 24, 2017

(54) SYSTEM AND METHOD FOR A BLAST ATTENUATING SEAT WITH LOWER-LIMB PROTECTION

(71) Applicant: Granite Tactical Vehicles Inc., Mount Airy, NC (US)

(72) Inventor: Christopher Berman, Mount Airy, NC (US)

(73) Assignee: Granite Tactical Vehicles Inc., Mount Airy, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,459

(22) Filed: Oct. 5, 2016

(65) Prior Publication Data

US 2017/0023335 A1 Jan. 26, 2017

Related U.S. Application Data

(63) Continuation of application No. 14/475,345, filed on Sep. 2, 2014, now Pat. No. 9,494,390.

(60) Provisional application No. 61/872,544, filed on Aug. 30, 2013.

(51) Int. Cl.
| | |
|---|---|
| *F41H 7/04* | (2006.01) |
| *B60N 2/427* | (2006.01) |
| *B60N 2/42* | (2006.01) |
| *B60N 2/48* | (2006.01) |
| *B60N 2/50* | (2006.01) |
| *B60N 2/52* | (2006.01) |
| *B60N 2/54* | (2006.01) |
| *B60N 2/02* | (2006.01) |

(52) U.S. Cl.
CPC .......... *F41H 7/046* (2013.01); *B60N 2/4242* (2013.01); *B60N 2/42736* (2013.01); *B60N 2/4882* (2013.01); *B60N 2/503* (2013.01); *B60N 2/509* (2013.01); *B60N 2/522* (2013.01); *B60N 2/544* (2013.01); *B60N 2002/022* (2013.01)

(58) Field of Classification Search
CPC .............................. B60N 2/4242; F41H 7/046
USPC .......................... 296/68.1, 65.02; 297/216.7
See application file for complete search history.

(56) References Cited

U.S. PATENT DOCUMENTS

| | | |
|---|---|---|
| 5,273,240 A | 12/1993 | Sharon |
| 5,758,859 A | 6/1998 | Gonzalez |
| 7,484,799 B2 | 2/2009 | Meyer |
| 7,744,155 B2 | 6/2010 | List et al. |
| 8,888,161 B1 | 11/2014 | Aragon et al. |

(Continued)

*Primary Examiner* — Jason S Morrow
(74) *Attorney, Agent, or Firm* — Davis Wright Tremaine LLP

(57) ABSTRACT

A blast attenuating seat system for protecting a vehicle occupant from impulses generated by blasts from underneath the vehicle, and methods for manufacturing and using same. The blast attenuating seat system includes a post, a mounting body coupled to a portion of the post and a seat assembly movably coupled to the mounting body configured to move relative to the post and mounting body. The seat assembly includes a seat body having a seat support structure configured to support a plurality of seat cushions and a shock assembly coupling the seat body and mounting body and configured to compress and expand such that the seat assembly moves relative to the post and mounting body. The blast attenuating seat system thereby provides/enables improved protection for vehicle occupants that may be exposed to explosive blasts.

16 Claims, 6 Drawing Sheets

(56) References Cited

U.S. PATENT DOCUMENTS

| | | |
|---|---|---|
| 8,939,502 B2 | 1/2015 | Grant et al. |
| 9,132,753 B1 | 9/2015 | Campbell |
| 2003/0051598 A1 | 3/2003 | Mauthe et al. |
| 2007/0035167 A1 | 2/2007 | Meyer |
| 2007/0273192 A1 | 11/2007 | Van Druff et al. |
| 2010/0207433 A1 | 8/2010 | Hahn |
| 2013/0214570 A1 | 8/2013 | Grant et al. |

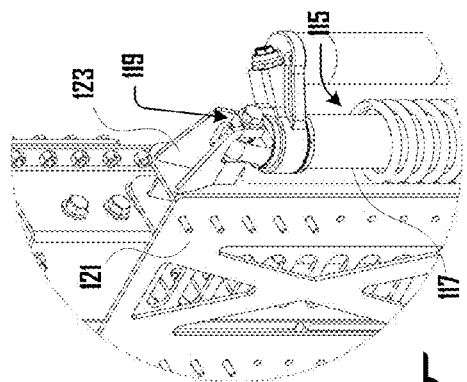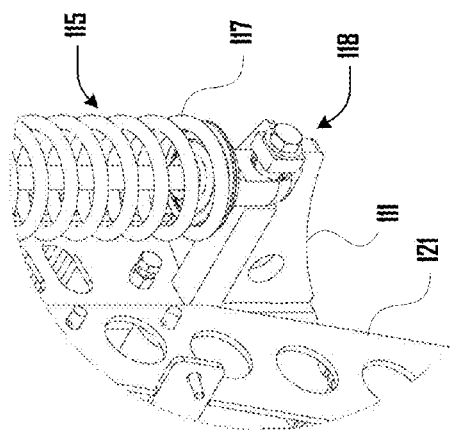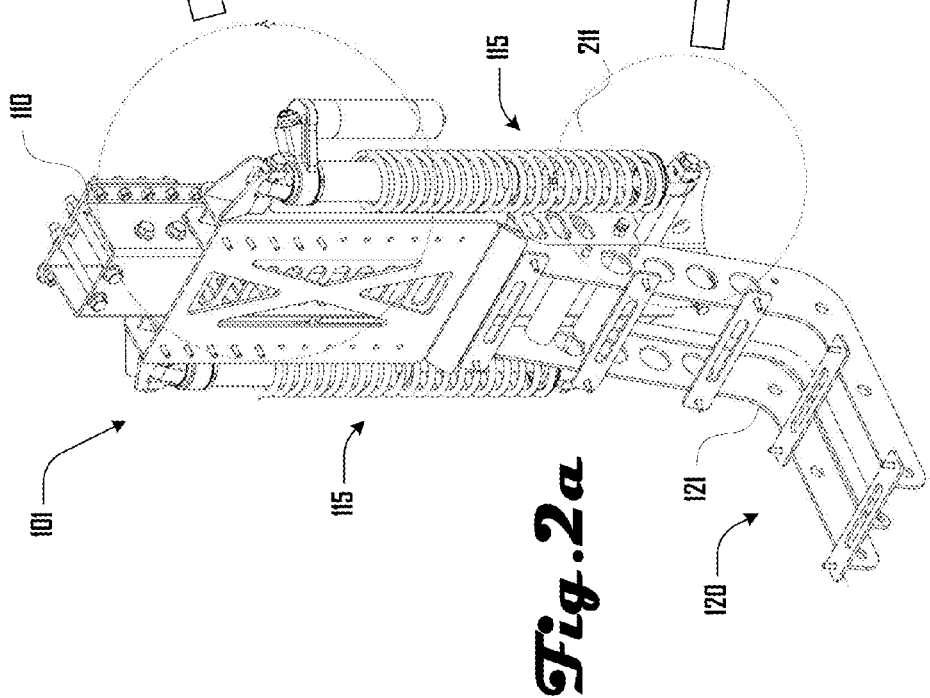

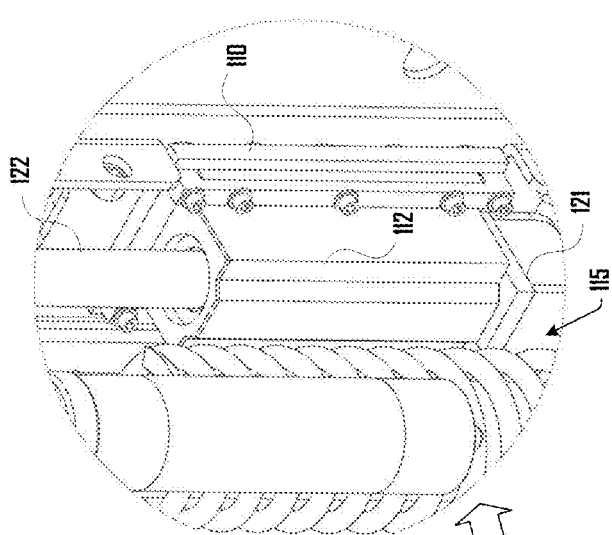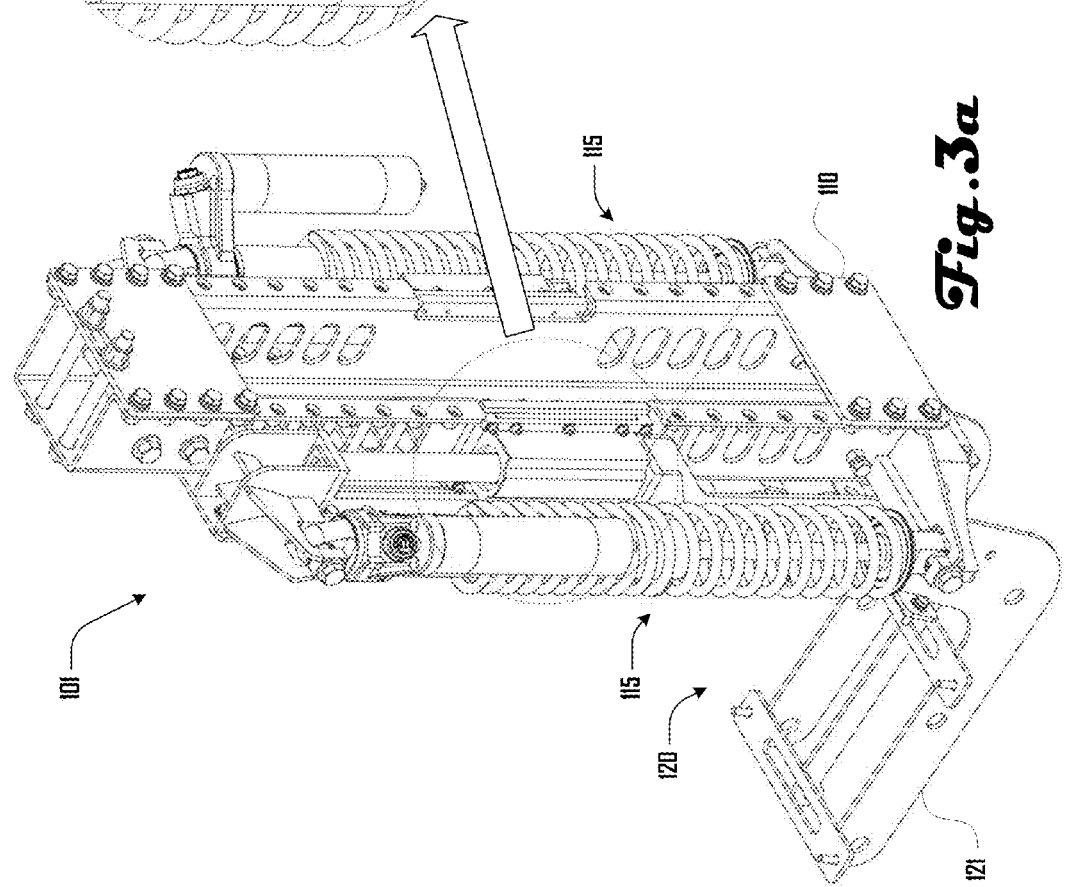

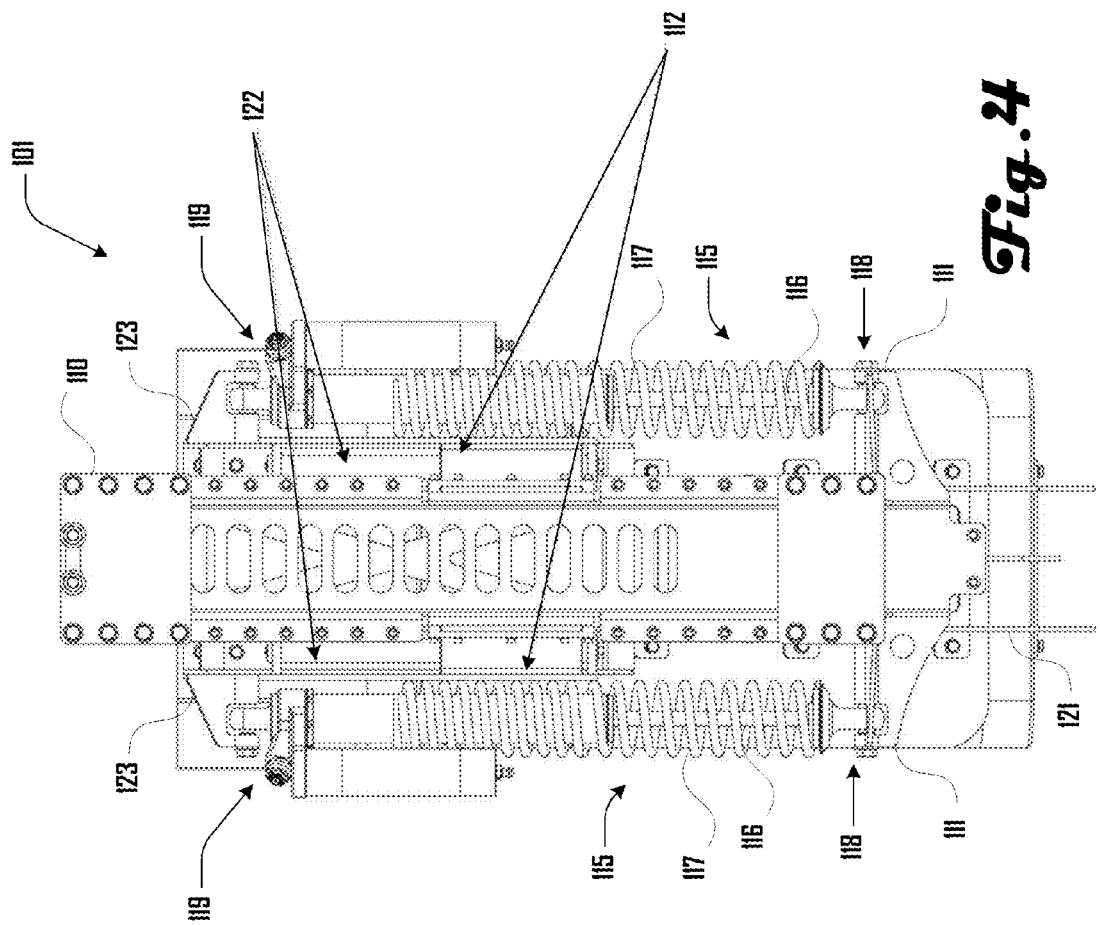

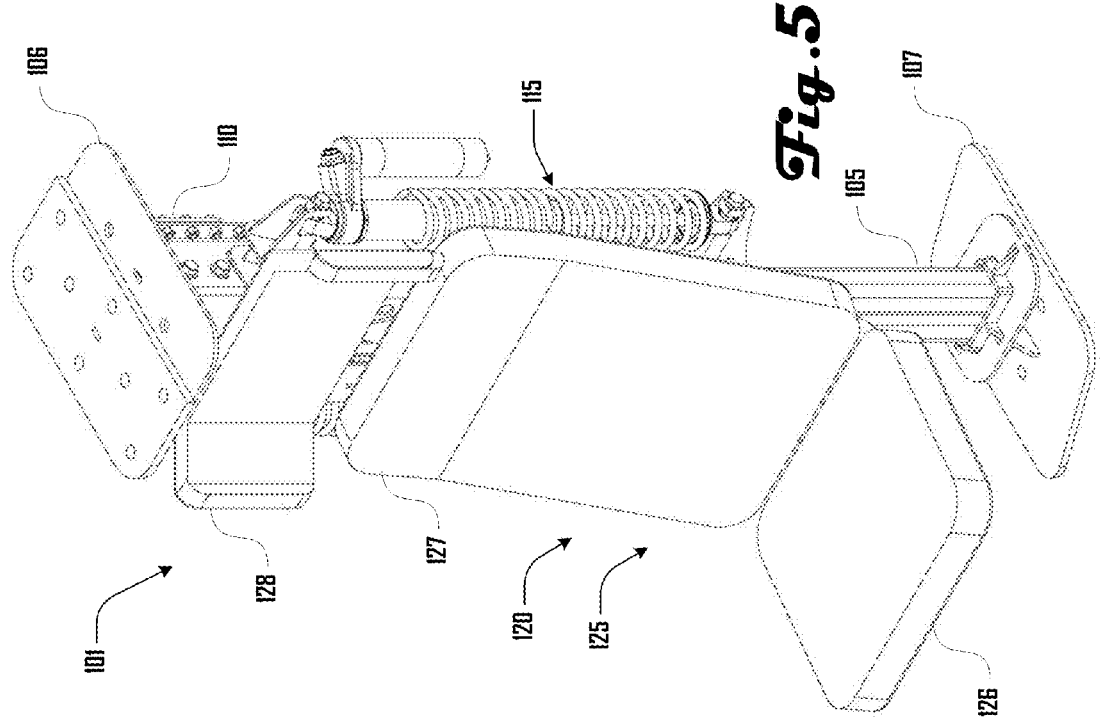

SYSTEM AND METHOD FOR A BLAST ATTENUATING SEAT WITH LOWER-LIMB PROTECTION

CROSS-REFERENCE TO RELATED APPLICATIONS

This application is a continuation of, and claims priority to, U.S. application Ser. No. 14/475,345, filed Sep. 2, 2014, which is a non-provisional of and claims the benefit of U.S. Provisional Application No. 61/872,544, filed Aug. 30, 2013, each of which is incorporated herein by reference for all purposes.

FIELD

This disclosure relates to a method and apparatus for protecting occupants of armored vehicles from injury when extreme impulses are applied to the vehicle (e.g., generated by explosive devices that are detonated beneath the vehicle or nearby).

BACKGROUND

Seats and associated mounting systems currently available are inadequate to withstand the forces transmitted by anti-vehicle mines and IED's. Innovations in vehicle armor are not alone sufficient to prevent severe injury to occupants of an armored vehicle.

Building upon the recent advances in armored vehicle passenger compartment design utilizing vertical floor to roof posts installed behind each seat position to improve floor and roof stiffness and prevent "oil canning", improved design calls for the seats to be roof mounted rather than floor mounted. Occupant seats are now routinely outfitted with 5-point seat belt/shoulder harnesses to hold the occupants securely in place during a blast, collision, or rollover.

In view of the foregoing, a need exists for an improved energy absorbing apparatus and system for overcoming acceleration resulting from blast impulses in an effort to overcome the aforementioned obstacles and deficiencies of conventional systems.

BRIEF DESCRIPTION OF THE DRAWINGS

FIG. 2a is an exemplary perspective drawing illustrating an embodiment of a blast attenuating seat assembly.

FIG. 2b is an exemplary perspective drawing illustrating a zoomed-in view of a top end of the shock assembly of FIG. 2a.

FIG. 2c is an exemplary perspective drawing illustrating a zoomed-in view of a bottom end of the shock assembly of FIG. 2a.

FIG. 3a is an exemplary perspective drawing illustrating an embodiment of a blast attenuating seat assembly.

FIG. 3b is an exemplary perspective drawing illustrating a zoomed-in view of a linear bearing of FIG. 3a.

FIG. 4 is an exemplary rear view drawing illustrating an embodiment of a blast attenuating seat assembly.

FIG. 5 is an exemplary perspective drawing illustrating an embodiment of a blast attenuating seat assembly.

Figure 1:
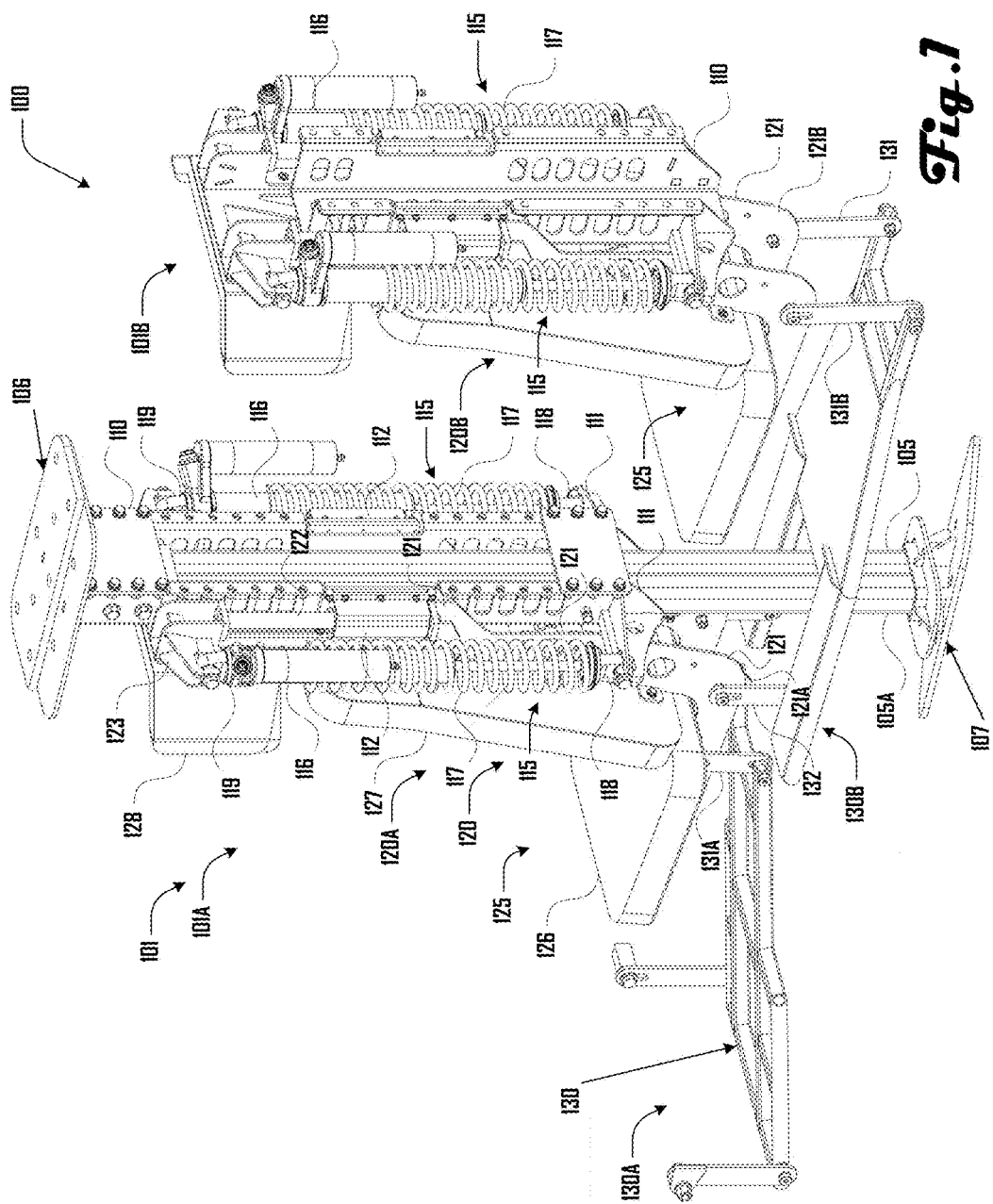
FIG. 1 is an exemplary perspective drawing illustrating an embodiment of a blast attenuating seat system.
Figure 6:
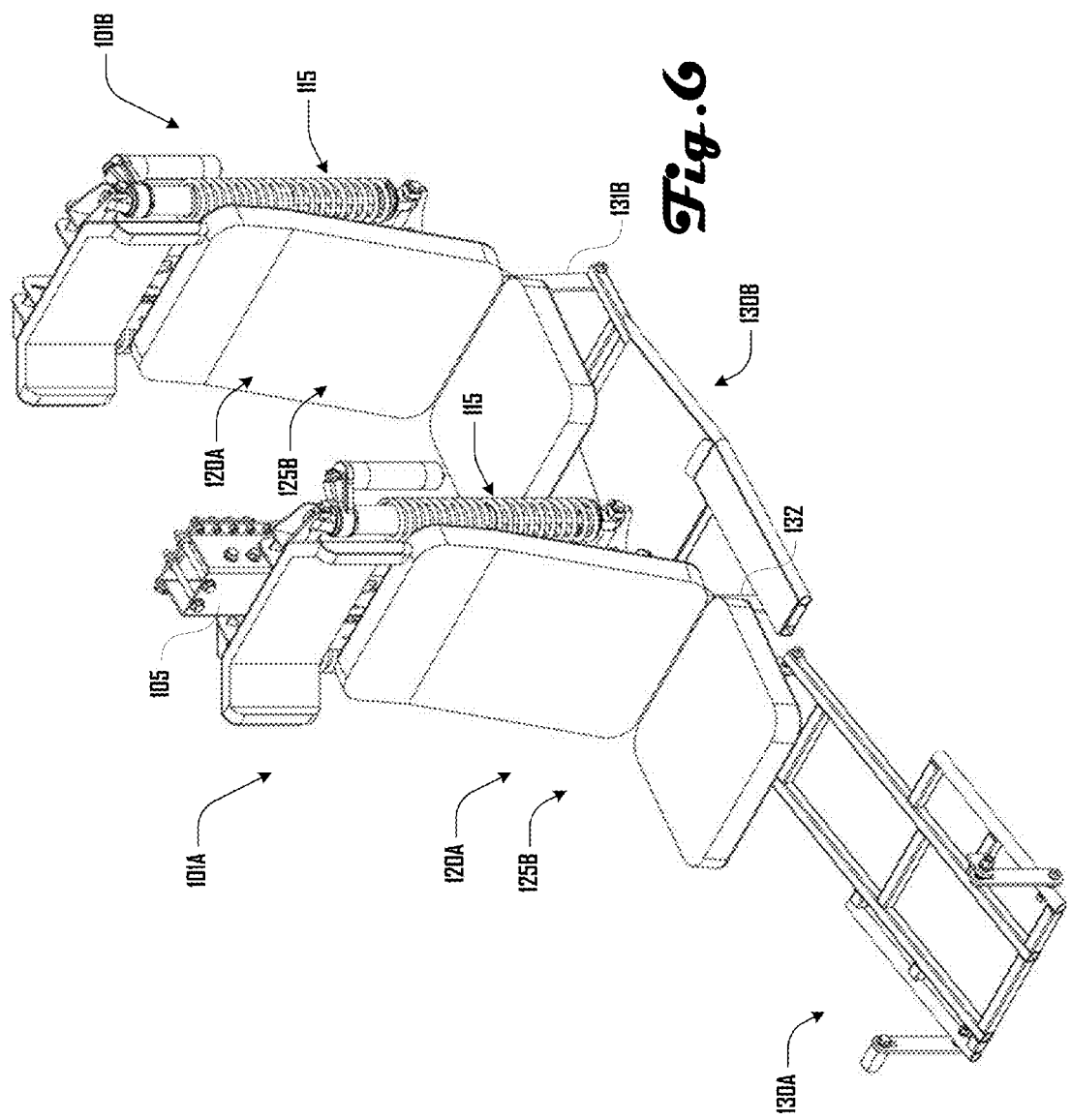
FIG. 6 is an exemplary perspective drawing illustrating an embodiment of a blast attenuating seat system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available seat systems are deficient because they fail to provide adequate protection for seat occupants, a blast attenuating seat system that provides improved protection for vehicle occupants that may be exposed to explosive blasts can prove desirable and provide a basis for a wide range of applications such as use in military vehicles. This result can be achieved, according to one embodiment disclosed herein, by a blast attenuating seat system 100 as illustrated in FIG. 1.

Turning to FIG. 1, the blast attenuating seat system 100 is shown comprising a first and second blast attenuating seat assembly 101A, 101B. As depicted in FIGS. 1a, 2a-c, 3a, 3b, 4, 5 and 6, each blast attenuating seat assembly 101 can comprise a post 105 that extends from a top end 106 to a bottom end 107. In various embodiments, the top and bottom end 106, 107 can be coupled to floor and roof within the cabin of a vehicle or other enclosure (not shown).

As discussed in more detail herein, one or more post 105 can be fixed within a vehicle and portions of one or more blast attenuating seat assemblies 101 is operable to translate relative to the post 105 in response to a blast or other force exerted on the vehicle. When disposed in a vehicle, the seat assemblies 101 can be substantially physically separated from the vehicle cabin so that the seat assemblies 101 are configured to move substantially independently compared to the vehicle and vehicle cabin, which can insulate seat occupants from blast forces exerted on the vehicle. A single post 105A is depicted in FIG. 1 associated with the first blast attenuating seat assembly 101A, however, a second post (not shown) can be associated with the second blast attenuating seat assembly 101B. For purposes of clarity, such a second blast attenuating seat assembly 101B is not shown in FIG. 1.

Referring to the first blast attenuating seat assembly 101A, a mounting body 110 can be fixedly coupled to a portion of the post 105. The mounting body 110 can comprise first and second lower mounting arms 111, that extend substantially perpendicularly relative to the post 105 on opposing sides of the post 105. The mounting body 110 can further comprise first and second linear bearings 112 fixedly mounted on opposing sides of the post 105. In various embodiments, the mounting body 110, first and second lower mounting arms 111, and first and second linear bearings 112 can be fixed relative to the post 105 and therefore move along with the post 105. As described herein, other parts of the blast attenuating seat assembly 101 may move relative to the post 105 and parts fixedly coupled therewith.

First and second shock assemblies 115 can be positioned on opposing sides of the post 105 and comprise a shock absorber 116 that is surrounded by a coil spring 117. The first and second shock assemblies 115 can be respectively coupled to the first and second lower mounting arms 111 at respective bottom ends 118.

A seat body 120 can be coupled at respective top ends 119 of the first and second shock assemblies 115, which as discussed herein, allows the seat body 120 to move relative to the post 105 via compression and expansion of the first and second shock assemblies 115.

The seat body comprises a seat support structure 121 that is coupled with respective shafts 122 that extend through respective linear bearings 112 and couple with respective shock assemblies 115 at respective coupling heads 123. In other words, the top ends 119 of the shock assemblies 115 couple with respective coupling heads 123 of the seat body 120. The coupling heads 123 communicate with the seat support structure 121 of the seat body via respective shafts 122 that extend through linear bearings 112 that are fixedly coupled to the post 105.

The seat bodies 120A, 120B can comprise a plurality of seat cushions 125, which can include a bottom-cushion 126, a back-cushion 127, and a headrest 128 that are mounded on the seat support structure 121. The seat bodies 120A, 120B can further include a footrest assembly 130 that is coupled to the seat support structure 121 at a footrest link 131.

In various embodiments, there may be one or more seat bodies 120 in a blast attenuating seat system 100. For example, as depicted in FIG. 1, there can be front and rear seat bodies 120A, 120B, which can comprise substantially the same parts. In some embodiments the front and rear seat bodies 120A, 120B can be coupled at a coupling link 132. For example, the front seat body 120A can include a first footrest assembly 130A, that is coupled to the front seat support structure 121A via a front footrest link 131A. The rear seat body 120B can include a rear footrest assembly 130B, that is coupled to the rear seat support structure 121B via a rear footrest link 131B. The coupling link 132 can couple rear footrest assembly 130B to the front seat support structure 121A.

In various embodiments, the footrest assembly 130 associated with each seat body 120 is configured to float above the floor of a vehicle passenger compartment that the blast attenuating seat system 100 is disposed in, by a distance greater than the designed expected maximum upward deflection of the floor resulting from an underbody blast of a defined magnitude. In some embodiments, the footrest assembly 130 can be configured to tilt down and away from the passenger seat 120 to induce the passenger to extend his feet further forward to padded or otherwise marked foot positions, reducing the likelihood of underbody blast impulses being transmitted upward through a vertically positioned lower limb. In various embodiments, the footrest assemblies 130 travel with the seat bodies 120 during a blast to avoid instances of relative movement causing injury.

In one embodiment, as depicted in drawing sheets 1-6, the seat assembly 101 is attached to vertical mounting post 105 at a pair of coupling heads 123 in such a way that impulses acting on the vertical post 105 through a vehicle hull (not shown) from below or above are first delayed for the maximum distance (and thus time), then are resisted by a pair of vertically mounted shock assemblies 115, which can be selected for a specific design compression and rebound. One or more compression coil springs 117 can surround a respective shock absorber 116, and can be similarly selected for a specific design compression and rebound.

In various embodiments, vertical travel of the seat body 120 relative to the post 105 may be along case hardened and precision ground steel shafts 122 mounted astride the seat body 120 and directly inward of each shock assembly 115. The shafts 122 can be configured and selected to be compatible with the maximum stroke of the shock absorbers 116 yet of a length sufficient to exceed the designed upward travel distance imparted to the vertical post 105 by an underbody blast of a defined magnitude or an impulse rebound or a follow-on shock wave following the vehicle hull and impacting the vertical post from above in a downward direction. In various embodiments, each of the paired vertical shafts 122 can pass through a pillow-block linear ball bearing unit 112 to resist deflection that could cause premature stop to the seat mount travel. In various embodiments, the bearing unit 112 can be held in place within a machine milled bearing mount plate configured to withstand shear force generated by a blast.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A blast attenuating seat system comprising:
   a first post extending from a first top end to a first bottom end;
   a first mounting body coupled to a portion of the first post that includes a first linear bearing;
   a first seat assembly movably coupled to the first mounting body configured to move relative to the first post and first mounting body, the first seat assembly including:
      a first seat body having a first seat support structure configured to support a plurality of first seat cushions;
      a first shock assembly coupling the first seat body and first mounting body and configured to compress and expand such that the first seat assembly moves relative to the first post and first mounting body; and
      a first shaft that movably extends through the first linear bearing;
   a second post extending from a second top end to a second bottom end;
   a second mounting body coupled to a portion of the second post that includes a second linear bearing; and
   a second seat assembly movably coupled to the second mounting body configured to move relative to the second post and second mounting body, the second seat assembly including:
      a second seat body having a second seat support structure configured to support a plurality of second seat cushions;
      a second shock assembly coupling the second seat body and second mounting body and configured to compress and expand such that the second seat assembly moves relative to the second post and second mounting body; and
      a second shaft that movably extends through the second linear bearing.

2. The blast attenuating seat system of claim 1, wherein the first and second seat assemblies further comprise respective first and second footrest assemblies.

3. The blast attenuating seat system of claim 2, wherein the second footrest assembly is coupled to a portion of the first seat assembly.

4. A blast attenuating seat system comprising:
   a post extending from a top end to a bottom end;
   a mounting body coupled to a portion of the post that includes a first bearing; and
   a seat assembly movably coupled to the mounting body configured to move relative to the post and mounting body, the seat assembly including:
      a seat body having a seat support structure configured to support a plurality of seat cushions;

a first and second shock assembly; and a first shaft that movably extends through the first bearing.

5. The blast attenuating seat system of claim 4, wherein the mounting body further comprises a second bearing.

6. The blast attenuating seat system of claim 5, wherein the seat assembly further comprises a second shaft that movably extends through the second bearing.

7. The blast attenuating seat system of claim 4, wherein the seat assembly further comprises a footrest assembly.

8. The blast attenuating seat system of claim 4, wherein the first and second shock assembly are disposed on opposing sides of the post.

9. The blast attenuating seat system of claim 4, wherein the first and second shock assembly extend substantially parallel to the post.

10. The blast attenuating seat system of claim 4, wherein the first and second shock assembly are coupled with the seat body at a top end, and coupled with the mounting body at a bottom end.

11. A blast attenuating seat system comprising:

a post extending from a top end to a bottom end;

a mounting body coupled to a portion of the post; and a seat assembly movably coupled to the mounting body configured to move relative to the post and mounting body, the seat assembly including:

a seat body having a seat support structure configured to support a plurality of seat cushions; and a shock assembly coupling the seat body and mounting body configured such that the seat assembly moves relative to the post and mounting body; and a first shaft that movably extends through a first bearing being movably coupled to the seat assembly.

12. The blast attenuating seat system of claim 11, wherein the mounting body includes a bearing.

13. The blast attenuating seat system of claim 12, wherein the seat assembly further comprises a shaft that movably extends through the bearing.

14. The blast attenuating seat system of claim 12, wherein bearing comprises a linear bearing.

15. The blast attenuating seat system of claim 12, wherein shock assembly is configured to compress and expand such that the seat assembly moves relative to the post and mounting body.

16. The blast attenuating seat system of claim 11, wherein the seat assembly further comprises a footrest assembly.

* * * * *